United States Patent
Peloso et al.

(10) Patent No.: US 7,653,307 B2
(45) Date of Patent: Jan. 26, 2010

(54) OPTICAL SWITCHING DEVICE FOR A TRANSPARENT NODE OF HIGH SWITCHING DEGREE ADAPTED TO SPECTRAL EQUALIZATION

(75) Inventors: Pierre Peloso, Marcoussis (FR); Nicolas Le Sauze, Bures-sur-Yvette (FR); Olivia Rofidal, Bure sur Yvette (FR)

(73) Assignee: Alcatel Lucent, Paris (FR)

( * ) Notice: Subject to any disclaimer, the term of this patent is extended or adjusted under 35 U.S.C. 154(b) by 547 days.

(21) Appl. No.: 11/564,125

(22) Filed: Nov. 28, 2006

(65) Prior Publication Data

US 2007/0183777 A1   Aug. 9, 2007

(30) Foreign Application Priority Data

Nov. 30, 2005  (FR) .................................. 05 53631

(51) Int. Cl.
*H04J 14/00* (2006.01)
*H04J 14/02* (2006.01)
(52) U.S. Cl. .............................. 398/50; 398/45; 398/48; 398/49; 398/55; 398/56; 398/83; 385/16; 385/17
(58) Field of Classification Search ............. 398/45–57, 398/83; 385/16, 17
See application file for complete search history.

(56) References Cited

U.S. PATENT DOCUMENTS

| | | | |
|---|---|---|---|
| 5,726,788 A | 3/1998 | Fee | |
| 6,331,906 B1 | 12/2001 | Sharma | |
| 2002/0197000 A1* | 12/2002 | Marom | 385/17 |
| 2004/0208551 A1* | 10/2004 | Weverka | 398/50 |

FOREIGN PATENT DOCUMENTS

EP    1 111 953 A    6/2001

* cited by examiner

*Primary Examiner*—Ken N Vanderpuye
*Assistant Examiner*—Daniel G Dobson
(74) *Attorney, Agent, or Firm*—Carmen Patti Law Group, LLC

(57) ABSTRACT

A device (D) dedicated to optical switching in a switching node (NC) comprises at least one first switching matrix (MC1) and one second switching matrix (MC2) coupled to each other and each comprising i) a first stage including $N_i$ diffusion modules each having a first input and $M_i$ first outputs and ii) a second stage including $N_i$ fusion modules each having $N_i$ second inputs each coupled to one of the $M_i$ first outputs of one of the $N_i$ diffusion modules via an optical line, at least one third input and one second output. The second stage of at least one of the matrices comprises at least one additional fusion module having $N_i$ second inputs adapted to apply optical power adjustment and one second output. At least one optical line (LS1) couples the second output of an additional fusion module of one of the matrices (MC1) to a third input of each of the $N_i$ fusion modules of the other matrix (MC2).

12 Claims, 10 Drawing Sheets

OPTICAL SWITCHING DEVICE FOR A TRANSPARENT NODE OF HIGH SWITCHING DEGREE ADAPTED TO SPECTRAL EQUALIZATION

The invention concerns transparent optical networks, and more precisely optical switching devices used in the transparent switching nodes of such networks.

Here the expression "transparent optical network" means a network in which all optical switching nodes are of transparent type so that the wavelength channels that contain the signals to be transmitted remain at all times in the optical domain.

Also, the expression "transparent switching node" here means a network equipment including at least one optical switching device of transparent type for routing channels that have been wavelength division multiplexed or are to be wavelength division multiplexed, coming from upstream optical lines and going to downstream optical lines without any optical/electrical/optical conversion thereof.

As the person skilled in the art knows, transparent optical network operators use switching nodes the degree of switching whereof is constantly increasing. The degree of switching of a node is the number of remote nodes to which the node may be connected or more precisely the number of fibers incoming to the node when a plurality of fibers connect two nodes. This degree of switching depends on the number and type of diffusion modules or fusion modules that an optical switching device installed in a switching node includes. For example, a node of degree 4 may be constructed from four 1×3 type diffusion modules coupled to four 3×1 type fusion modules.

Here the expression "diffusion module" means equipment for routing multiplexed optical channels that it receives at its input to one or more of its outputs as a function of their respective wavelengths. In other words, a diffusion module has an at least partial "internal routing" function that enables it to deliver at each of its outputs one or more (or even all) of the optical channels of a multiplex that it has received at its input. It may be a non-selective diffusion module, for example, such as a coupler (or "optical splitter"), or a selective diffusion module, such as a wavelength selection module of WSS (standing for "Wavelength Selective Switch") type. In the latter case, the various optical channels are routed to the outputs as a function of a specific command (each received channel can be distributed to only one output). WSS modules are described in particular in the document by T. Ducellier et al. "The MWS 1×4: A High Performance Wavelength Switching Building Block", Conference ECOC'2002, Copenhagen, 9 Sep. 2002, 2.3.1.

Additionally, the expression "fusion module" here means equipment for multiplexing (or routing internally) optical channels that it receives at its respective inputs in order to deliver an optical channel or a multiplex of optical channels at its output. In other words, a fusion module has a (possibly programmable) multiplexing function enabling it to supply at its single output either a selected optical channel of the optical channels received at its inputs or a multiplex consisting of a set of optical channels selected from the optical channels received at its inputs. It is either a non-selective fusion module, such as an optical coupler, or a selective fusion module, such as a wavelength selection module of the WSS type.

At present switching nodes of degree 3 or 4 can be made. Such nodes include optical switching devices comprising, for example:

a first stage including three or four diffusion modules each having a first input intended to be coupled to an upstream optical line (dedicated to the transport of multiplexed channels with different wavelengths) and at least three or four first outputs each adapted to deliver at least one of the multiplexed channels received by the first input, a second stage including three or four fusion modules each comprising at least three or four second inputs each adapted to receive at least one wavelength channel and a second output intended to be coupled to a downstream optical line (dedicated to the transport of multiplex channels with different wavelength) and adapted to deliver at least one channel received at one of the second inputs, and a third stage including respective optical lines coupling the first outputs to the second inputs.

An optical switching device of the above kind is described in the US patent document 2002/0197000 A1 in particular.

To obtain nodes of switching degree greater than 4, at least two solutions have been proposed.

A first solution consists in electrically coupling via an electrical switching matrix nodes having a low degree of switching, for example two nodes of degree 3 or 4. However, this greatly increases the cost of the resulting structure, because it increases both the number of electrical interfaces (drop modules (Rx) and add modules (Tx)), the size of the electrical switching matrix and the size of the spectral selection stage for adding and dropping (given that the interface between the two nodes is treated as a drop interface in one node and an add interface in the other node).

A second solution uses the architecture of the optical switching device described hereinabove, employing a greater number of 1×9 type (rather than 1×4 type) diffusion modules and a greater number of 9×1 type (rather than 4×1 type) fusion modules. Unfortunately, if 9×1 type WSS fusion modules (or 1×9 type WSS diffusion modules) are used to effect spectral equalization by attenuating the optical power of certain channels, their most eccentric five inputs (or outputs) induce spectral flatness defects on filtering (sometimes called "side lobes") if attenuation is applied to them.

No known solution proving entirely satisfactory, the invention therefore has the objective of improving upon the situation.

To this end it proposes an optical switching device for use in a switching node of a transparent optical network and including:

at least first and second switching matrices each comprising:

a first stage including $N_i$ diffusion modules each having a first input intended to be coupled to an upstream optical line dedicated to the transport of multiplexed channels and $M_i$ first outputs where "i" is an index designating each matrix, $N_i$ is an integer greater than or equal to 2 and $M_i$ is an integer greater than $N_i$, and a second stage including $N_i$ fusion modules each having $N_i$ second inputs each coupled to one of the $M_i$ first outputs of one of the $N_i$ diffusion modules via an optical line, at least one third input, and one second output intended to be coupled to a downstream optical line dedicated to the transport of multiplexed channels, the second stage of at least one of the switching matrices comprising at least one additional fusion module having $N_i$ second inputs and one second output, at least certain of the first outputs and the second inputs (of the fusion modules and additional fusion module(s)) being adapted to apply optical power adjustment, at least one optical line coupling the second output of an additional fusion module of one of the switching matrices to a third input of each of the $N_i$ fusion modules of the other switching matrix.

The device according to the invention may have other features and in particular, separately or in combination:

each first stage may comprise at least one additional diffusion module having a fourth input connected to an optical line so as to be coupled to the second output of a fusion module belonging to a switching matrix different from its own and $N_i$ first outputs each coupled to a third input of each fusion module of its own switching matrix;

the second stage of each switching matrix may comprise at least one additional fusion module having $N_i$ second inputs, where applicable adapted to apply optical power adjustment, and one second output;

the first stage of each switching matrix comprises at least one additional diffusion module having a fourth input and $N_i$ first outputs, where applicable adapted to apply optical power adjustment;

each first stage may comprise at last two additional diffusion modules and each second stage may comprise at least two additional fusion modules, in which case the optical switching device comprises at least four optical lines each coupling the second output of one of the additional fusion modules of one of the switching matrices to the fourth input of one of the additional fusion modules of the other switching matrix;

at least one of the optical lines connecting the switching matrices may be equipped with amplification means;

each first output of a diffusion module is adapted to deliver at least one of the multiplexed channels received by the first input of that diffusion module, each second output of a fusion module of the second switching matrix is able to deliver at least one channel received on one of the second inputs of that fusion module, and each second output of an additional fusion module is able to deliver at least one channel received at one of the second inputs of that additional fusion module;

its diffusion modules and each additional diffusion module may for example be optical couplers with at least one input and a plurality of outputs, in which case their first inputs may not be adapted to apply optical power adjustment;

alternatively, its diffusion modules and each additional fusion module may be wavelength selection modules, for example of WSS type, in which case the first outputs of the diffusion modules may be adapted to apply optical power adjustment;

its fusion modules and each additional fusion module may for example be wavelength selection modules, for example of WSS type, in which case their second inputs may be adapted to apply optical power adjustment;

alternatively, its fusion modules and each additional fusion module may for example be optical couplers with at least one output and a plurality of inputs, in which case their second inputs may not be adapted to apply optical power adjustment.

The invention also proposes a switching node for use in a (D)WDM network and equipped with at least one optical switching device of the type described hereinabove. This kind of switching node may take the form of a transparent optical cross-connect unit, for example.

Other features and advantages of the invention will become apparent on reading the following detailed description and examining the appended drawings, in which.

Figure 4:
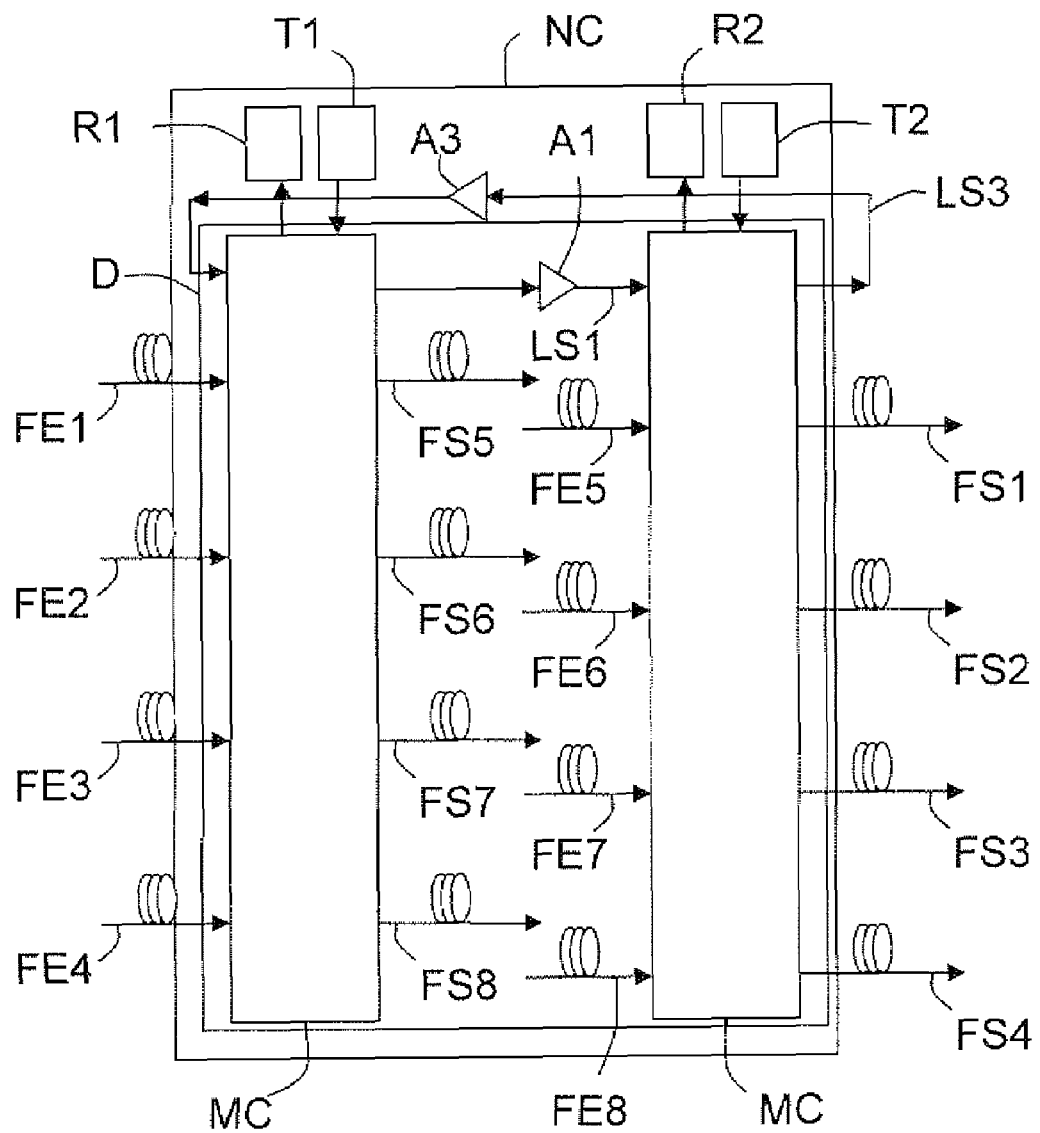
Figure 5:
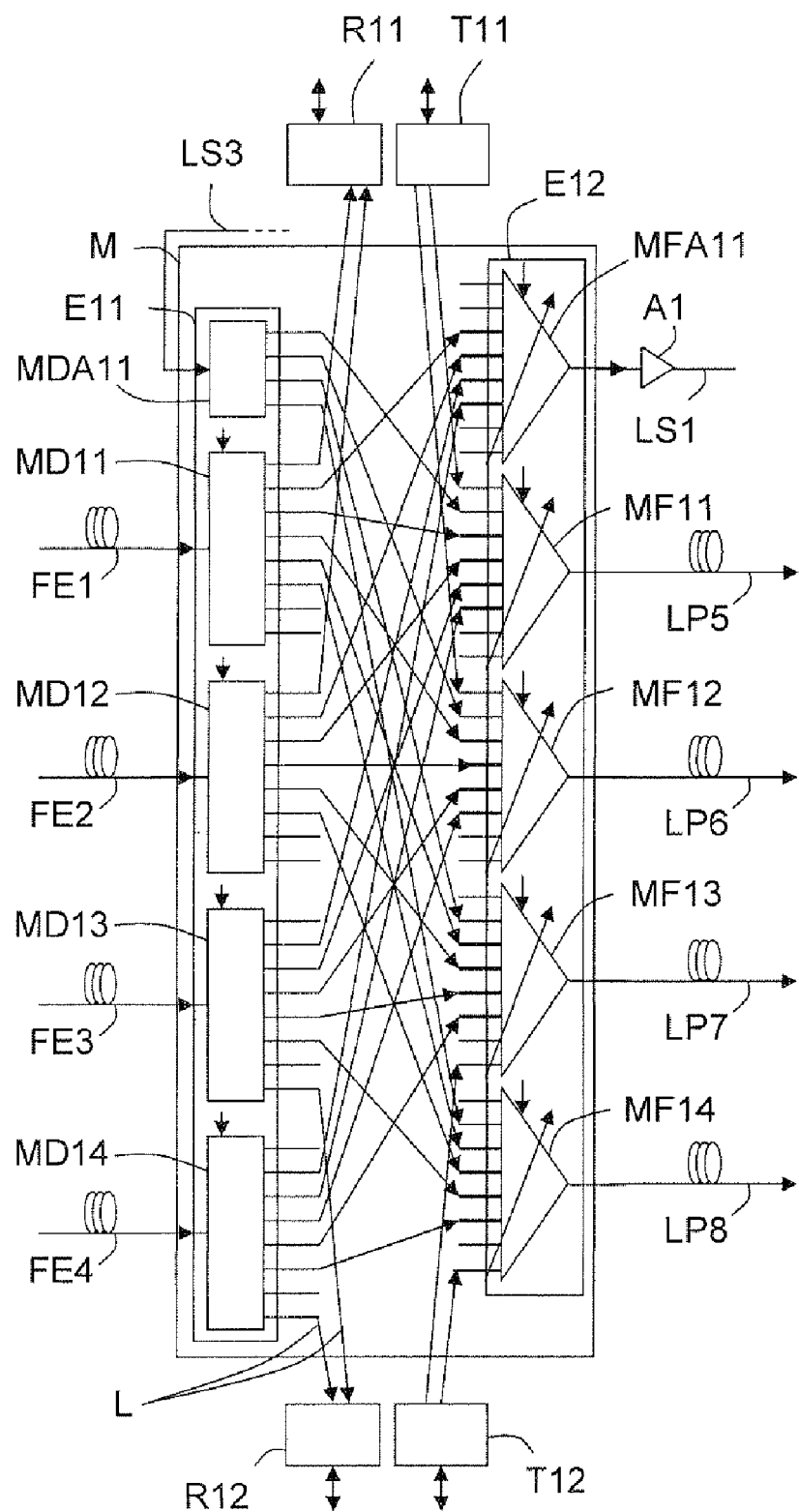
Figure 6:
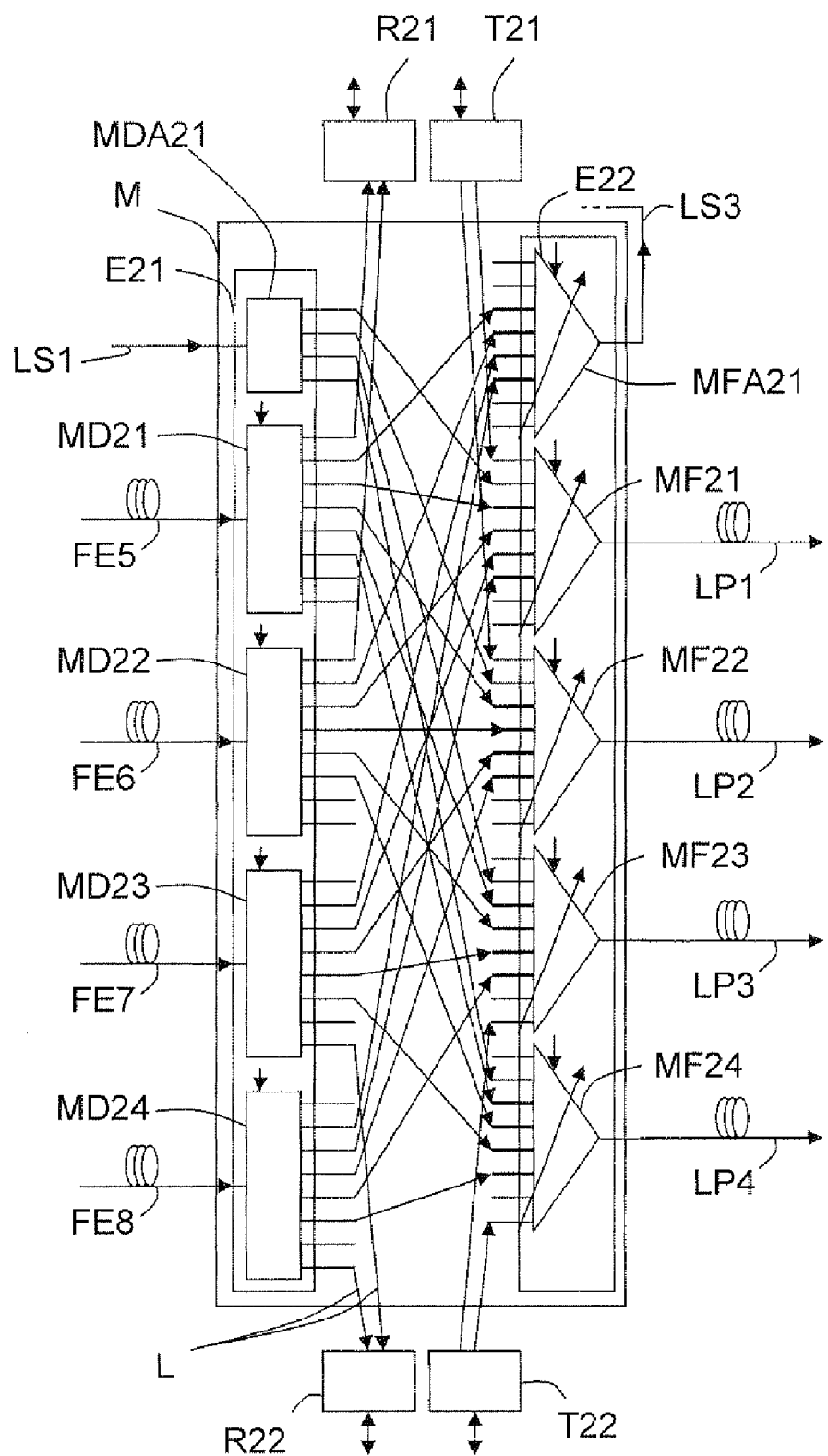
Figure 7:
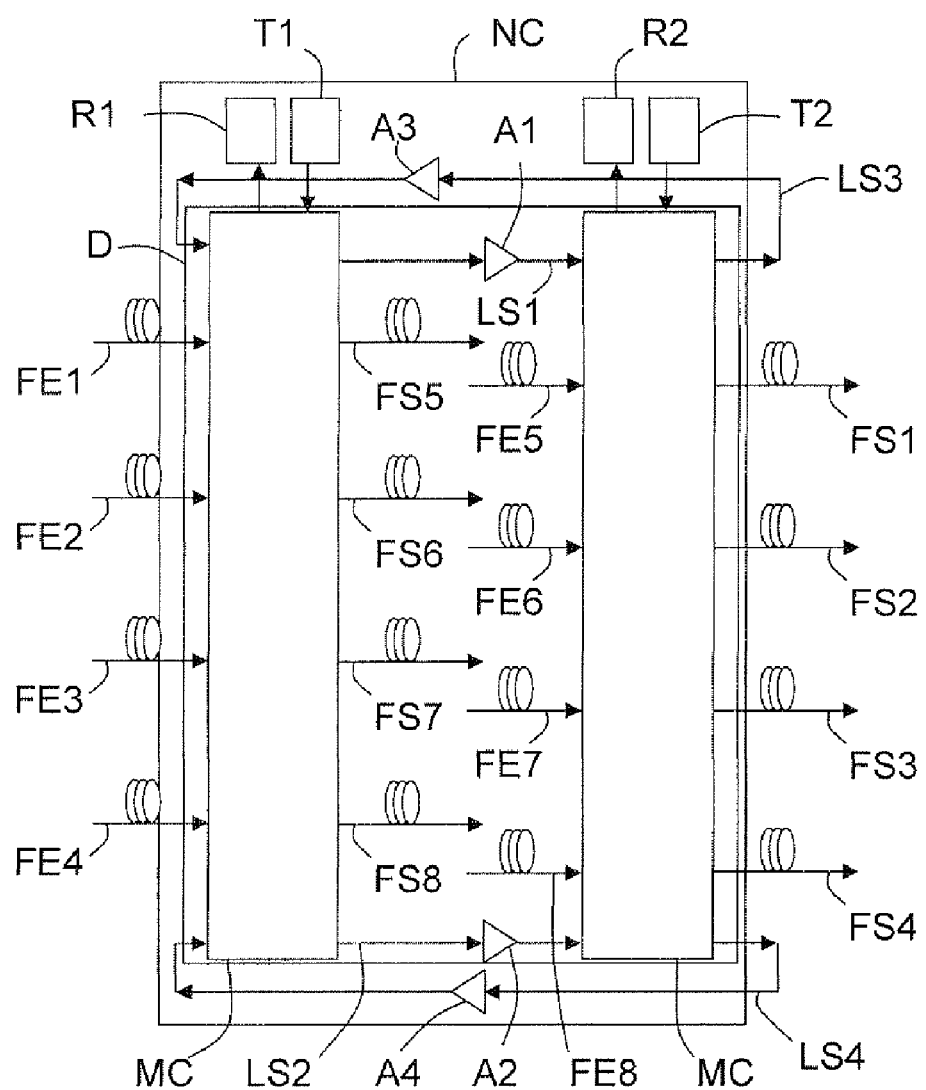
Figure 8:
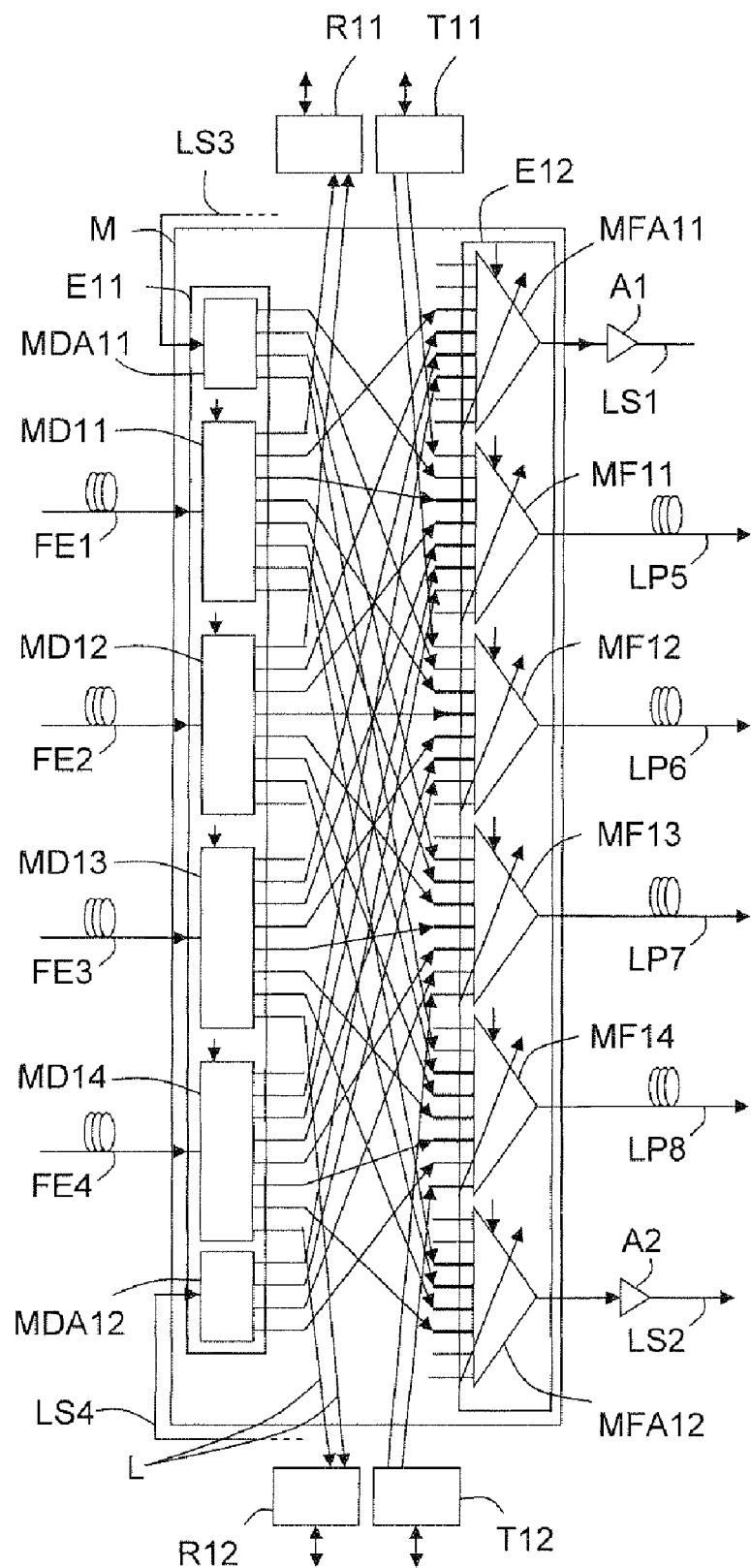
Figure 9:
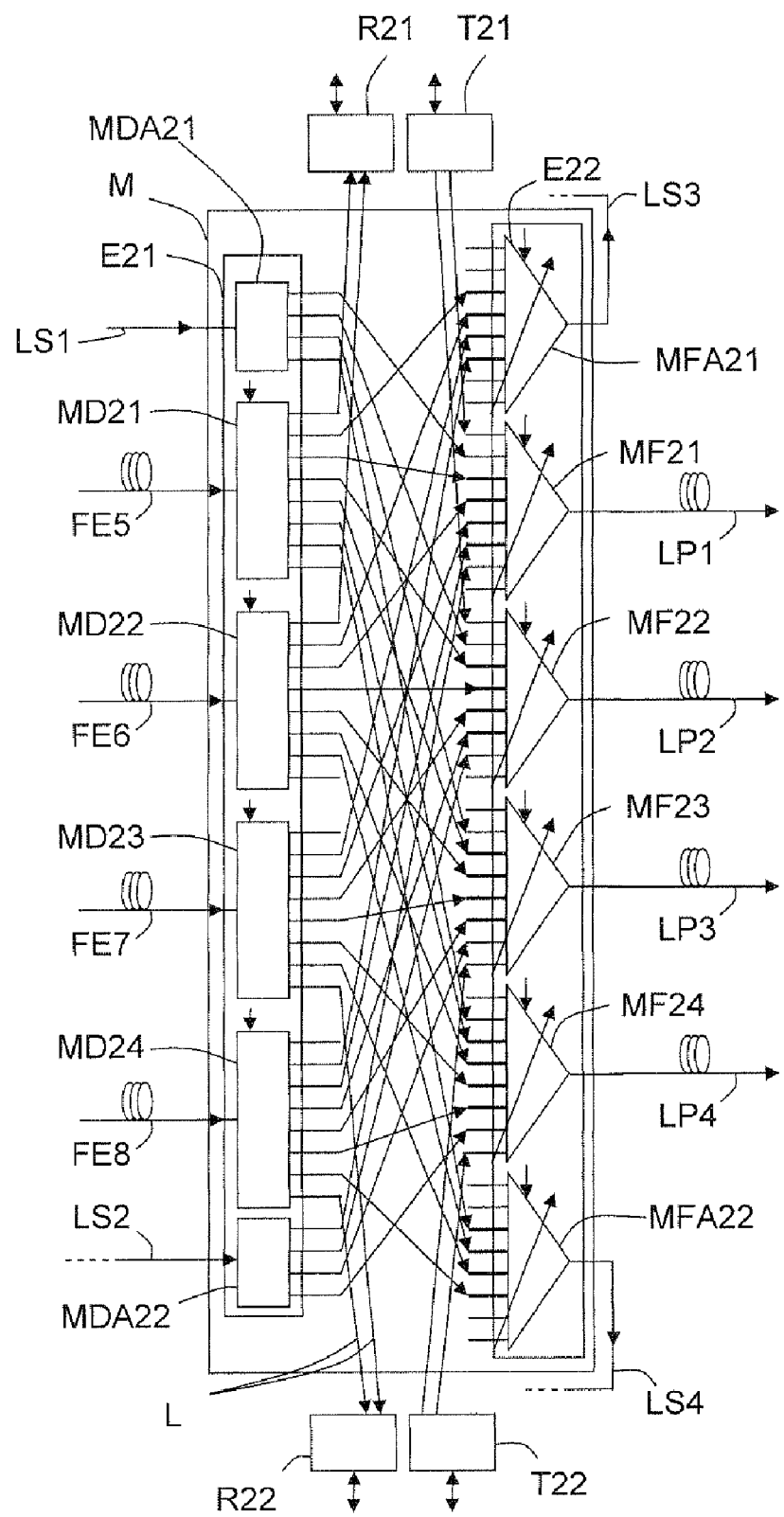
Figure 10:
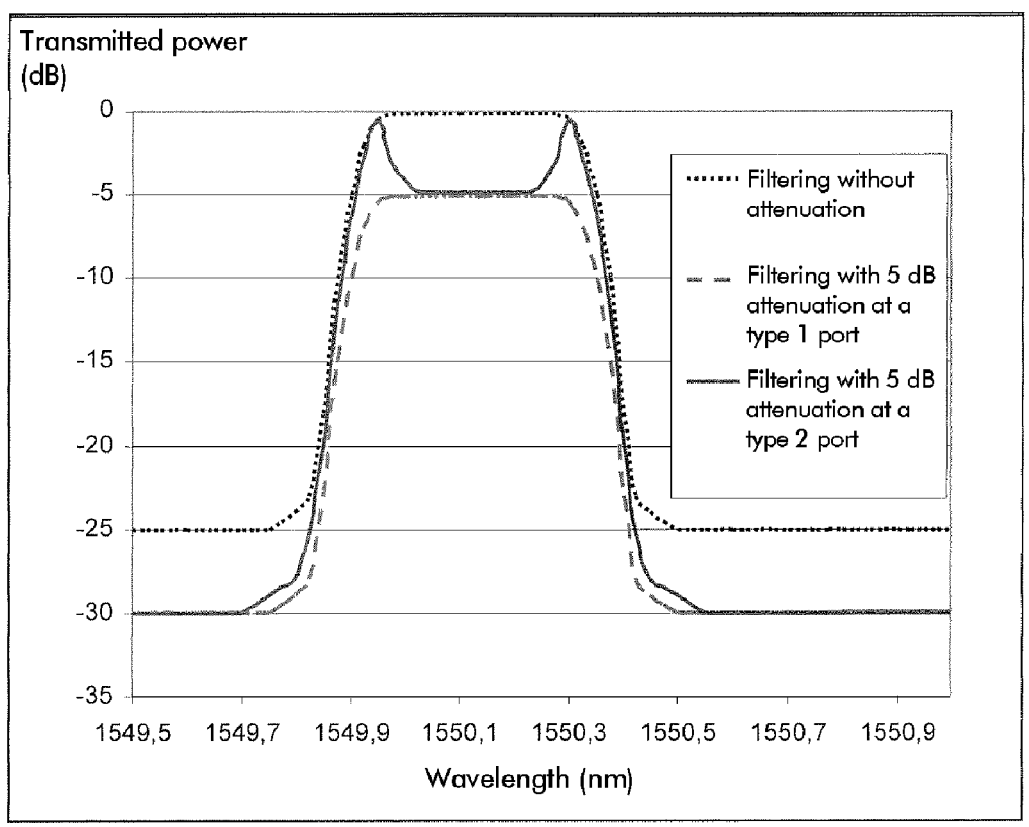

FIG. 4 shows diagrammatically and functionally a second embodiment of an optical switching device according to the invention, FIG. 5 shows diagrammatically and functionally a second embodiment of a first switching matrix with which the optical switching device shown in FIG. 4 may be equipped, FIG. 6 shows diagrammatically and functionally a second embodiment of a second switching matrix with which the optical switching device shown in FIG. 4 may be equipped, FIG. 7 shows diagrammatically and functionally a third embodiment of an optical switching device according to the invention, FIG. 8 shows diagrammatically and functionally a third embodiment of a first switching matrix with which the optical switching device shown in FIG. 7 may be equipped, FIG. 9 shows diagrammatically and functionally a third embodiment of a second switching matrix with which the optical switching device shown in FIG. 7 may be equipped, and FIG. 10 shows three curves representing the evolution of the power (in dB) transmitted by a WSS type port as a function of wavelength (in nm), respectively with no attenuation (dotted line), with filtering and with 5 dB of attenuation (continuous line—type 2 port), and with filtering and with 5 dB of attenuation (dashed line—type 1 port).

The appended drawings constitute part of the description of the invention as well as contributing to the definition of the invention, if necessary.

An object of the invention is to propose a new optical switching device architecture for transparent switching nodes, for example of degree 4 or higher, having no or virtually no spectral flatness defect caused by filtering, for use in a transparent optical network.

The switching nodes considered hereinafter by way of nonlimiting example are transparent optical cross-connects (OXC) of a (D)WDM ((Dense) Wavelength Division Multiplexing) network. These nodes may also have add/drop functions.

Figure 1:
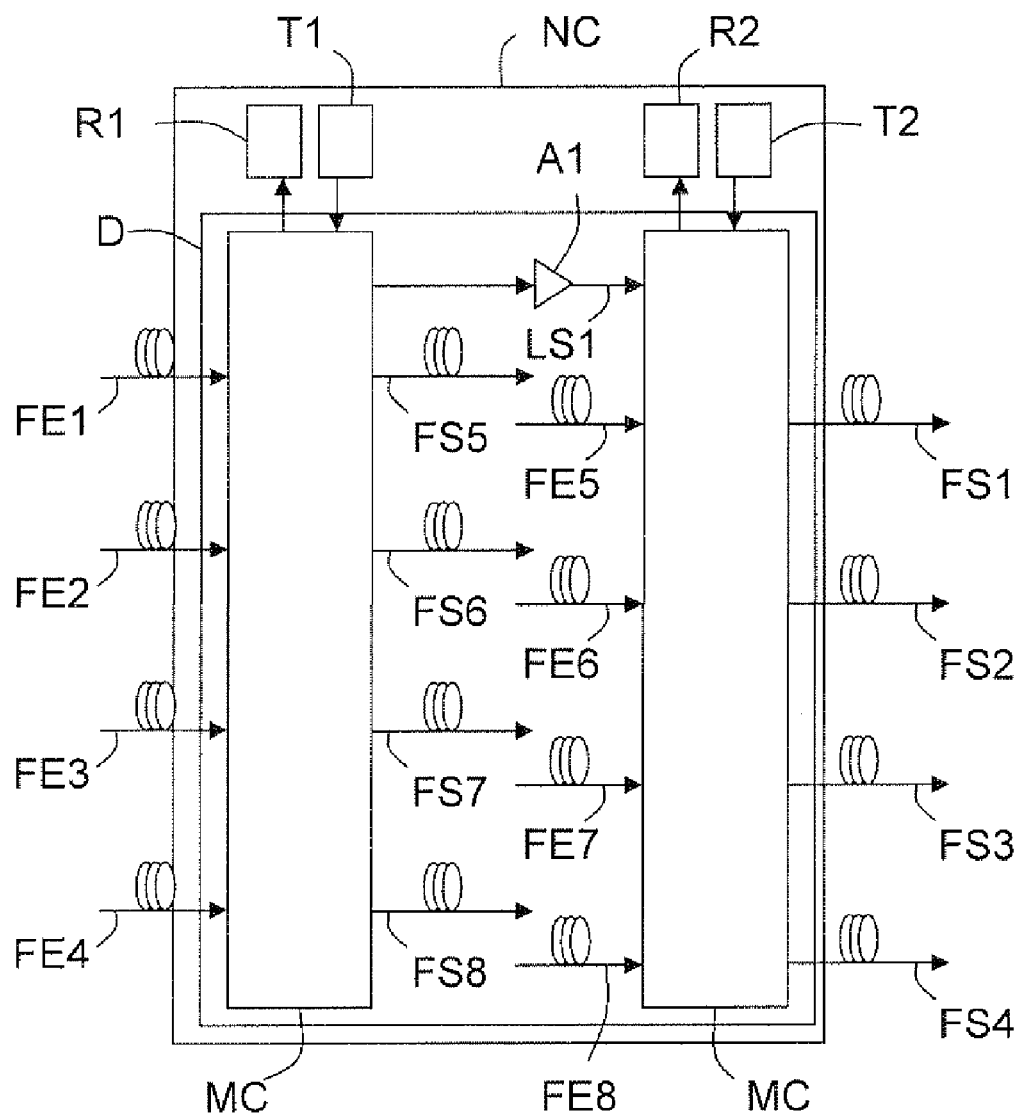
FIG. 1 shows diagrammatically and functionally a first embodiment of an optical switching device according to the invention.

As shown in FIG. 1, a (switching) node NC comprises at least one optical switching device D according to the invention.

Figure 2:
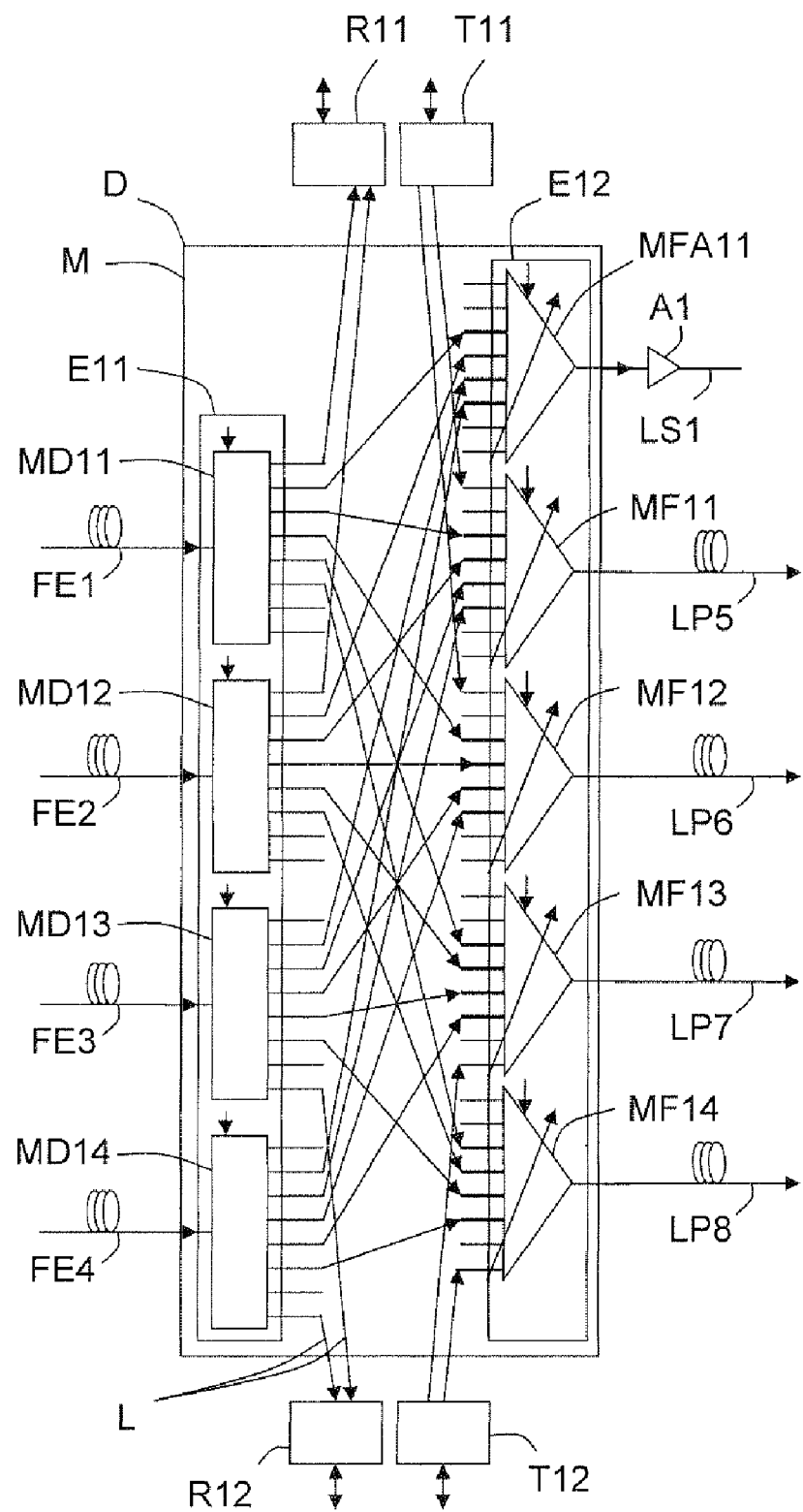
FIG. 2 shows diagrammatically and functionally a first embodiment of a first switching matrix with which the optical switching device shown in FIG. 1 may be equipped.
Figure 3:
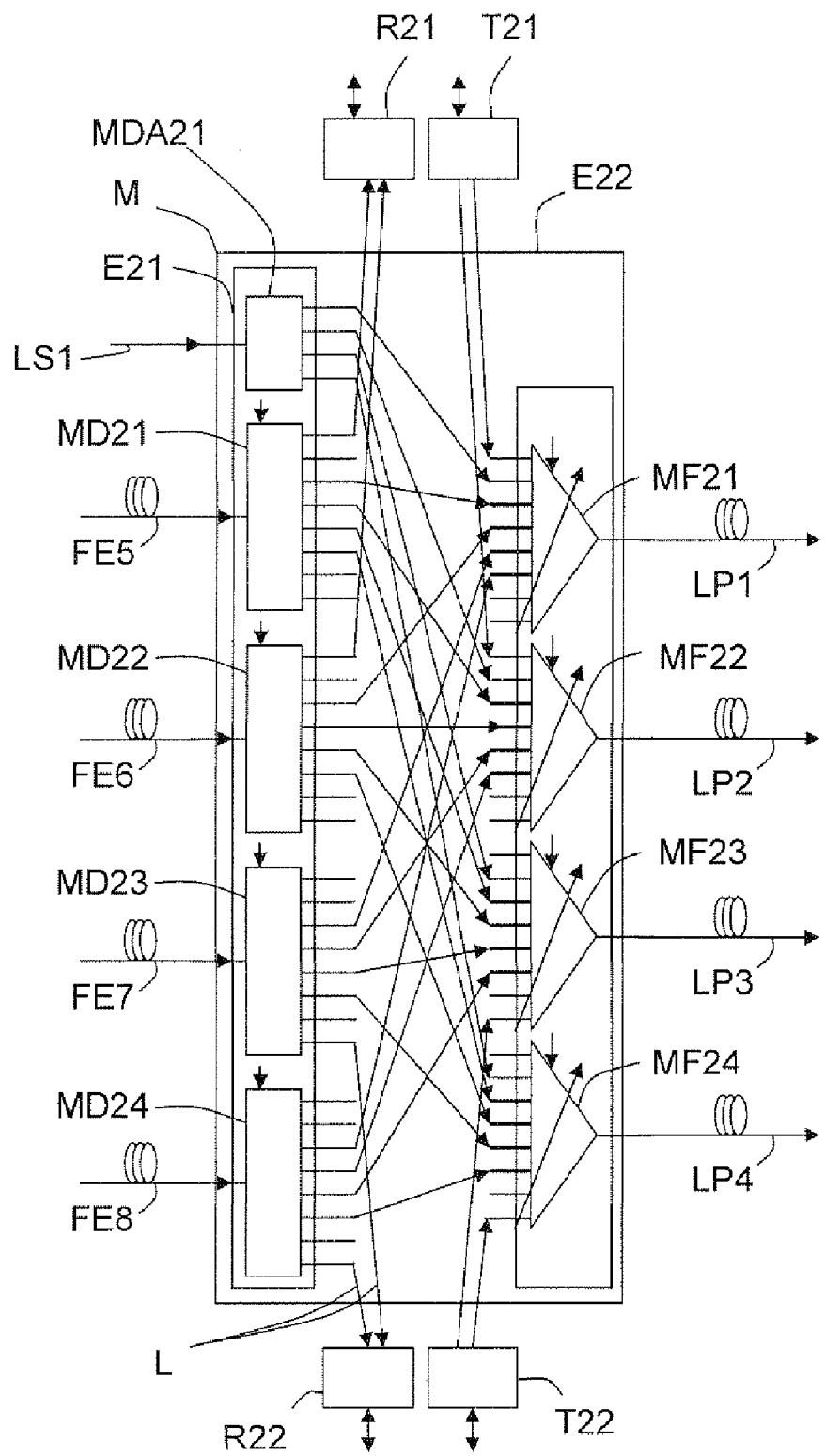
FIG. 3 shows diagrammatically and functionally a first embodiment of a second switching matrix with which the optical switching device shown in FIG. 1 may be equipped.

The device D includes at least one first switching matrix MC1 and one second switching matrix MC2 that are optically coupled. FIG. 2 shows a first embodiment of a first switching matrix MC1 and FIG. 3 shows a first embodiment of a second switching matrix MC2.

Each switching matrix MCi (here i=1 or 2, but i may take a value greater than 2) comprises a first stage Ei1 and a second stage Ei2 that are optically coupled to each other by optical lines L.

Each first stage Ei1 includes at least $N_i$ diffusion modules $MDij_j$ ($j_1=1$ to $N_1$ and $j_2=N_1+1$ to $N_{1+N2}$) each having at least one first input and $M_i$ first outputs. Each first input of a switching matrix MCi defines one of the input ports of the device D. Each input port is coupled to a portion of an input (or upstream) optical line $FEj_i$, for example an optical fiber, in which "circulate" multiplexed channels with different wavelengths, also referred to as optical signal spectral multiplexes.

It is important to note that the number $N_i$ of diffusion modules $MDij_i$ can vary from one switching matrix MCi to another MCi'. Likewise, the number $M_i$ of first outputs of the diffusion module $MDij_i$ may vary from one switching matrix MCi to another MCi'. In other words, there are the options $N_i=N_{i'}$ or $N_i \neq N_{i'}$, and $M_i=M_{i'}$ or $M_i \neq M_{i'}$. In the nonlimiting examples shown in the figures and described hereinafter, $N_i=N_{i'}$ and $M_i=M_{i'}$, and more precisely $N_1=N_2$ and $M_1=M_2$.

Hereinafter, the expression "optical channel" means a channel associated with a given wavelength. For example, each input optical fiber $FEj_i$ is capable of transporting R optical channels (R>0).

In the examples shown in FIGS. 1 to 9, the index $j_1$ takes values from 1 to 4 and the index $j_2$ take values from 5 to 8, because $N_1$ and $N_2$ are both equal to 4 (for example). However, the indices $j_i$ are not limited to these values, which are set by the number of input ports of the device D.

Moreover, in the examples shown in FIGS. 1 to 9, all the $M_i$ (here M1 and M2) are equal to 8. But the value of each $M_i$ may be less than or greater than 8, provided that the $M_i$ concerned is strictly greater than the corresponding $N_i$ for reasons explained later.

Each diffusion module $MDij_i$ is responsible for routing multiplexed optical channels that it receives at its input (coupled to an input optical line $Flj_i$) to one or more of its $M_i$ first outputs as a function of their respective wavelengths. In other words, a diffusion module $MDij_i$ has an at least partial "internal routing" function that enables it to deliver at each of its $M_i$ first outputs one or more (or even all) of the optical channels of a multiplex that it has received at its first input.

In the examples shown in FIGS. 1 to 9, each broadcast module $MDij_i$ has a first drop output that is coupled to a drop module Ri1 or Ri2 of the node NC. In a variant, the drop modules Ri1 and Ri2 could be part of the device D. In FIGS. 2 and 3 (5 and 6, and 8 and 9), each switching matrix MCi includes two separate drop modules Ri1 and Ri2, but they could be grouped into a single module Ri as shown in FIG. 1. This first drop output recovers at the level of the node NC the signals that are contained in one or more channels transported by any one of the input lines $FEj_i$ with a view to local processing and/or transmission to at least one terminal connected to the node NC.

In the examples shown in FIGS. 1 to 9, the diffusion modules $MDij_i$ are of non-selective type. For example they are optical couplers (or "optical splitters") responsible for delivering at each of their first outputs all of the optical channels of each multiplex that their first input receives. It is important to note that the optical channels that are routed to a given first output of a coupler $MDij_i$ must be associated with different wavelengths.

In a variant, the diffusion modules could be of selective type. In this case, they constitute wavelength selection modules of WSS type, for example, like those mentioned in the introduction. These wavelength selection modules are adjustable as a function of a command and can deliver at each of their $M_i$ first outputs either an optical channel selected from the optical channels received at their first input or a multiplex consisting of a set of optical channels selected from the optical channels of the multiplex received at their first input, as a function of a specific command. The channels are selected internally by means of integrated filters.

Wavelength selection modules of the WSS type are particularly advantageous because they induce no insertion losses, unlike simple couplers if their number ($M_i$) of outputs is greater than 4.

Each second stage Ei2 includes firstly at least $N_i$ fusion modules MFij each having $N_i$ second inputs, at least one third input and one second output intended to be coupled to an output (or downstream) optical line $FSj_i$, for example an optical fiber, in which optical signal spectral multiplexes "circulate".

Each fusion module $MFij_i$ has a (possibly programmable) multiplexing function for supplying at its second output either an optical channel selected from the optical channels received at its $N_i$ second inputs and its third inputs or a multiplex consisting of a set of optical channels selected from the optical channels received at its $N_i$ second inputs and its third inputs.

In the examples shown in FIGS. 1 to 9, each fusion module $MFij_i$ has a third add input that is coupled to an add module Ti1 or Ti2 of the node NC. In a variant, the add modules Ti1 and Ti2 could be part of the device D. In FIGS. 2 and 3 (5 and 6, and 8 and 9), each switching matrix MCi includes two separate add modules Ti1 and Ti2, but they could be grouped into a single module Ti as shown in FIGS. 1, 4 and 7. This third add input feeds the diffusion module $MFij_i$ concerned with one or more channels in order, where appropriate, to multiplex the channel(s) with other channels received by at least one of its other second inputs.

It is important to note that a fusion module $MFij_i$ may have a plurality of third add inputs, just as a diffusion module $MDij_i$ may have a plurality of first drop outputs.

In the examples shown in FIGS. 1 to 9, the fusion modules $MFij_i$ are of the selective type. They are wavelength selection modules of the WSS type, for example, like those described hereinabove and in the introduction. In this case, they are adjustable as a function of a command and can deliver at their second output either an optical channel selected from optical channels received at their $N_i$ second inputs and their third input(s) or a multiplex consisting of a set of optical channels selected from the optical channels received at their $N_i$ second inputs and their third input(s), as a function of a specific command.

However, in a variant, they could be of the non-selective type, in which case they constitute optical couplers, for example, responsible for delivering at their second output a multiplex consisting of all the optical channels received at their $N_i$ second inputs and their third input(s).

The second inputs of the fusion modules $MFij_i$ or at least some of the first outputs of the diffusion modules $MDij_i$ are of a first type whereas at least some of the first outputs of the diffusion modules $MDij_i$ or the third inputs of the fusion modules $MFij_i$ are of a second type.

Here the expression "input or output of a first type" means an input or an output that is adapted to attenuate selectively the optical power of each of the channels that it receives. Spectral equalization can therefore be effected by appropriate attenuation of the respective second inputs or first outputs.

Moreover, the expression "input or output of a second type" here means an input or an output that degrades the integrity of the optical signal that goes to this output when the optical power of the channel conveying that signal is adjusted. Here the expression "degrades" refers to inducing spectral flatness defects reflected in the appearance of side lobes. FIG. 10 shows three curves representing the evolution of the power (in dB) transmitted by a WSS type port as a function of the wavelength (in nm), respectively with no attenuation (dotted line), with filtering and 5 dB attenuation (continuous line—type 2 port—presence of side lobes), and with filtering and 5 dB attenuation (dashed line—type 1 port).

In the example shown, the second inputs of the fusion modules $MFij_i$ (shown by thicker lines) are of a first type and each third input of a fusion module $MFij_i$ is of a second type.

The fusion modules $MFij_i$ being here of the WSS type (for example), their second inputs are preferably those that are the least eccentric of all their outputs in order for the channels that pass through them to be the least disturbed, whereas the third inputs are the most eccentric.

The second stage E2 of at least one of the switching matrices MCi comprises at least one additional fusion module MFAik having at least $N_i$ second inputs and at least one second output.

In the (nonlimiting) examples shown, the second inputs of each additional fusion module MFAik are of the first type. They are therefore adapted to apply optical power adjustment and participate in the spectral equalization effected by the device D.

It is important to note that only the second inputs of the selective (for example WSS) type fusion modules or only the first outputs of the selective (for example WSS) type diffusion modules may be adapted to apply optical power adjustment. Thus if the fusion modules are of non-selective type (for example couplers), their second inputs may not be adapted to apply optical power adjustment. Likewise, if the diffusion modules are of non-selective type (for example couplers), their first outputs may not be adapted to apply optical power adjustment. The same goes for the additional fusion modules and the additional diffusion modules.

As shown, each additional fusion module MFAik may be identical to a fusion module $MFij_i$ of the second stage E2i of which it is part, but it is preferable to use only its second inputs (here of the first type) and not its third inputs (which here are the most eccentric because they are part of the WSS, for example). Each additional fusion module MFAik can therefore be of selective type (wavelength selection module, for example of WSS type), as in the example shown, or of non-selective type (optical coupler).

The second output of each additional fusion module MFAik of a switching matrix MCi is coupled to a third input of each of the $N_i$ fusion modules $MFi'j_i$ of the other switching matrix MCi' (i'≠i) by means of an optical line LSn.

The coupling between the second output of an additional fusion module MFAik of at least one of the switching matrices MCi and a third input of each of the $N_i$ fusion modules $MFi'j_i$ of the other switching matrix MCi' (i'≠i) may be effected through an additional diffusion module MDAik having a fourth input and $N_i$ first outputs and forming part of the first stage E1 of the other switching matrix MCi'. More precisely, the first end of an optical line LSn is connected to the second output of an additional fusion module MFAik associated with a switching matrix MCi whereas the second end of this optical line LSn is connected to the fourth input of an additional diffusion module MDAi'k associated with the other switching matrix MCi'.

It is important to note that the switching matrices MCi may include different numbers of additional diffusion modules MDAik and/or different numbers of additional fusion modules MFAik.

Accordingly, in the first embodiment of the device D, shown in FIGS. 1 to 3, only the first switching matrix MC1 (FIG. 2) comprises an additional fusion module MFA11, whereas only the second switching matrix MC2 (FIG. 3) comprises an additional diffusion module MDA21. The two switching matrices MCi are therefore not identical. More precisely, the second output of the additional fusion module MFA11 of the second stage E12 of the first switching matrix MC1 is coupled to the fourth input of the additional diffusion module MDA21 of the first stage E21 of the second switching matrix MC2 by means of the optical line LS1 (n=1).

In this first embodiment of the device D, the channels coming from the input optical lines FE1 to FE4 can either leave via the output optical lines FS5 to FS8 respectively coupled to the second outputs of the fusion modules MF11 to MF14 of the first switching matrix MC1 or leave via the optical output lines FS1 to FS4 respectively coupled to the second outputs of the fusion modules MF21 to MF24 of the second switching matrix MC2, thanks to the fusion module MFA11 and to the diffusion module MDA21. The channels coming from the input optical lines FE5 to FE8 can leave only via the output optical lines FS1 to FS4.

In the second embodiment of the device D, shown in FIGS. 4 to 6, each switching matrix MCi (MC1 (FIG. 5), MC2 (FIG. 6)) comprises both an additional fusion module MFAi1 (MFA11, MFA21) and an additional diffusion module MDAi1 (MDA11, MDA21). The two switching matrices MCi are therefore identical. More precisely, the second output of the additional fusion module MFA11 of the second stage E12 of the first switching matrix MC1 is coupled to the fourth input of the additional diffusion module MDA21 of the first stage E21 of the second switching matrix MC2 by means of said optical line LS1 (n=1) and the second output of the additional fusion module MFA21 of the second stage E22 of the second switching matrix MC2 is coupled to the fourth input of the additional diffusion module MDA11 of the first stage E11 of the first switching matrix MC1 by means of the optical line LS3 (n=3).

In this second embodiment of the device D, the channels coming from the input optical lines FE1 to FE4 can leave either via the output optical lines FS5 to FS8 respectively coupled to the second outputs of the fusion modules MF11 to MF14 of the first switching matrix MC1, or via the optical output lines FS1 to FS4 respectively coupled to the second outputs of the fusion modules MF21 to MF24 of the second switching matrix MC2, thanks to the fusion module MFA11 and to the diffusion module MDA21. The channels coming from the input optical lines FE5 to FE8 can leave either via the output optical lines FS1 to FS4 or via the output optical lines FS5 to FS8, thanks to the fusion module MFA21 and to the diffusion module MDA11.

In the third embodiment of the device D, shown in FIGS. 7 to 9, each switching matrix MCi (MC1 (FIG. 8), MC2 (FIG. 9)) comprises both two additional fusion modules MFAi1 and MFAi2 and two additional diffusion modules MDAi1 and MDAi2. The two switching matrices MCi are therefore identical in this example where the $N_i$ are equal to each other and the $M_i$ are also equal to each other. More precisely, the second output of the additional fusion module MFA11 of the second stage E12 of the first switching matrix MC1 is coupled to the fourth input of the additional diffusion module MDA21 of the first stage E21 of the second switching matrix MC2 by the optical line LS1 (n=1), the second output of the additional fusion module MFA12 of the second stage E12 of the first switching matrix MC1 is coupled to the fourth input of the additional diffusion module MDA22 of the first stage E21 of the second switching matrix MC2 by the optical line LS (n=2), the second output of the additional fusion module MFA21 of the second stage E22 of the second switching matrix MC2 is coupled to the fourth input of the additional diffusion module MDA11 of the first stage E11 of the first switching matrix MC1 by the optical line LS3 (n=3), and the second output of the additional fusion module MFA22 of the second stage E22 of the second switching matrix MC2 is coupled to the fourth input of the additional diffusion module MDA12 of the first stage E11 of the first switching matrix MC1 by the optical line LS4 (n=4).

In this third embodiment of the device D, the channels coming from the optical input lines FE1 to FE4 can leave either via the optical output lines FS5 to FS8 respectively coupled to the second outputs of the fusion modules MF11 to MF14 of the first switching matrix MC1 or via the optical output lines FS1 to FS4 respectively coupled to the second outputs of the fusion modules MF21 to MF24 of the second switching matrix MC2, thanks to the fusion module MFA11 and to the diffusion module MDA21 or thanks to the fusion module MFA12 and to the diffusion module MDA22. The channels coming from the input optical lines FE5 to FE8 can leave either via the output optical lines FS1 to FS4 or via the output optical lines FS5 to FS8 thanks to the fusion module MFA21 and to the diffusion module MDA11 or thanks to the fusion module MFA22 and to the diffusion module MDA12.

At least one of the optical lines LSn, which are optical fibers, for example, may be equipped with amplification means An. In the three examples shown in FIGS. 1 to 9, each optical line LSn (LS1 to LS4, n=1 to 4) is equipped with amplification means An (A1 to A4). The amplification means An may be EDFA (Erbium Doped Fiber Amplifiers), for example.

Each additional diffusion module MDAik is preferably of the same type as the diffusion modules $MDAij_i$ of the first stage Ei1 of which it is part. Consequently, each additional diffusion module MDAik can be either of non-selective type ("optical splitter" type coupler), as in the example shown, or of selective type (wavelength selection module, for example of WSS type).

Where appropriate, and as shown, an additional diffusion module MDAik has only $N_i$ (first) outputs whereas a diffusion module $MDAij_i$ has $M_i$ (first) outputs ($M_i > N_i$). Accordingly, in the examples shown in which all $M_i$ are equal to 8 and all $N_i$ are equal to 4, each additional diffusion module MDAik has four first outputs, whereas each diffusion module $MDij_i$ has eight first outputs.

If the switching matrices MCi are identical, they can include any number of additional diffusion modules MDAik and/or any number of additional fusion modules MFAik. For example, this number may be equal to 1 (k=1) or equal to 3 (k=1 to 3) or equal to 4 (k=1 to 4).

Thanks to the invention, all channels arriving at an optical switching device D can be attenuated correctly, providing effective spectral equalization.

The invention is not limited to the optical switching device and communication node embodiments described above by way of example only, and encompasses all variants that the person skilled in the art might envisage that fall within the scope of the following claims.

Thus there have been described hereinabove embodiments of an optical switching device comprising only two switching matrices optically coupled to each other. However, the invention applies equally to situations in which the optical switching device includes more than two switching matrices optically coupled to each other. For example, it may be envisaged that the device include a first switching matrix optically coupled to a second switching matrix itself coupled to a third switching matrix which is itself optically coupled to the first switching matrix.

Moreover, there is described hereinabove an embodiment of an optical switching device in which the switching matrices include a number $N_i$ of diffusion modules (and of fusion modules) equal to four (4). However, the invention applies to all situations in which $N_i$ is greater than or equal to two ($N_i \geq 2$).

Furthermore, there have been described hereinabove with reference to FIGS. 1 to 9 three embodiments of an optical switching device in which the switching matrices include diffusion modules (including additional diffusion modules) of coupler (optical splitter) type and fusion modules (including additional fusion modules) of wavelength selection module (for example WSS) type. However, there may be envisaged a first variant in which the switching matrices include diffusion modules (including additional diffusion modules) and fusion modules (including additional fusion modules) of wavelength selection module (for example WSS) type and a second variant in which the switching matrices include diffusion modules (including additional diffusion modules) of wavelength selection module (for example WSS) type and fusion modules (including additional fusion modules) of coupler (optical coupler) type.

The invention claimed is:

1. Optical switching device (D) for a switching node (NC) of a transparent optical network, comprising at least two switching matrices (MCi) coupled to each other, characterized in that each switching matrix (MCi) comprises:

a first stage (Ei1) including $N_i$ diffusion modules (MDij) each having an input adapted to be coupled to an upstream optical line (FEj) dedicated to the transport of multiplexed channels and $M_i$ outputs, where $N_i$ is an integer greater than or equal to two and $M_i$ is an integer greater than or equal to $N_i$, and a second stage (Ei2) including $N_i$ fusion modules (MFij) each having $N_i$ inputs each coupled to one of the outputs of one of the $N_i$ diffusion modules (MDij) via an optical line (L) and an output adapted to be coupled to a downstream optical line ($FSj_i$) dedicated to the transport of multiplexed channels, in that the device comprises at least one first additional fusion module (MFA11) having inputs coupled via optical lines to outputs of said diffusion modules (MD1$j$) of a first of said switching matrices and one output, in that the inputs of said fusion modules and of said first additional fusion module that are coupled to said outputs of the diffusion modules or the outputs of the diffusion modules that are coupled to said inputs are adapted to apply optical power adjustment, in that fusion modules (MF2$j$) of a second of said switching matrices (MC2) respectively have at least one additional input, and in that it comprises at least one optical line (LS1) coupling the output of said first additional fusion module (MFA11) to said additional inputs of the fusion modules (MF2$j$) of the second switching matrix (MC2).

2. Device according to claim 1, characterized in that it comprises at least one first additional diffusion module (MDA21) having an input connected to an optical line (LS1) so as to be coupled to the output of said first additional fusion module (MFA11) and outputs coupled to the additional inputs of the fusion modules (MF2$j$) of the second switching matrix (MC2).

3. Device according to either of claims 1 and 2, characterized in that it comprises at least one second additional fusion module (MFA21) having inputs coupled by optical lines to outputs of said diffusion modules (MD2$j$) of said second switching matrix and one output, said inputs of the second additional fusion module (MFA21) or the outputs of the diffusion modules that are coupled to said inputs being adapted to apply optical power adjustment, in that the fusion modules (MF1$j$) of the first switching matrix (MC1) have at least one respective additional input, and in that it comprises at least one optical line (LS3) coupling the output of said second additional fusion module (MFA21) to said additional inputs of the fusion modules (MF1j) of the first switching matrix (MC1).

4. Device according to claim 3, characterized in that it comprises at least one second additional diffusion module (MDA11) having an input connected to an optical line (LS3) so as to be coupled to the output of said second additional fusion module (MFA21) and outputs coupled to said additional inputs of the fusion modules (MF1j) of the first switching matrix (MC1).

5. Device according to claim 4, characterized in that each of said switching matrices comprises at least two additional diffusion modules (MDAik) and at least two additional fusion modules (MFAik) and in that it comprises at last four optical lines (LSn) each coupling the output of one of said additional fusion modules (MFAik) of one of said switching matrices (MCi) to the input of one of said additional diffusion modules (MDAi'k) of the other switching matrix (MCi').

6. Device according to claim 1, characterized in that at least one of said optical lines (LSn) is equipped with amplification means (An).

7. Device according to claim 1, characterized in that said diffusion modules (MDij) and each additional diffusion module (MDAik) are selected from a group comprising optical couplers with at least one input and a plurality of outputs and wavelength selection modules.

8. Device according to claim 1, characterized in that said fusion modules (MFij) and each additional fusion module (MFAik) are wavelength selection modules.

9. Device according to claim 1, characterized in that said fusion modules (MFij) and each additional fusion module (MFAik) are selected from a group comprising optical couplers with at least one output and a plurality of inputs and wavelength selection modules.

10. Device according to claim 1, characterized in that said diffusion modules (MDij) and each additional diffusion module (MDAik) are wavelength selection modules.

11. Device according to claim 7, characterized in that said wavelength selection modules (MDij; MFij) are of the "WSS" type.

12. Switching node (NC) in the form of a transparent optical cross-connect for a wavelength division multiplex optical network, characterized in that it comprises at least one optical switching device (D) according to claim 1.

* * * * *

UNITED STATES PATENT AND TRADEMARK OFFICE
CERTIFICATE OF CORRECTION

PATENT NO. : 7,653,307 B2
APPLICATION NO. : 11/564125
DATED : January 26, 2010
INVENTOR(S) : Peloso et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 606 days.

Signed and Sealed this

Twenty-eighth Day of December, 2010

David J. Kappos
*Director of the United States Patent and Trademark Office*